United States Patent Office 2,849,390
Patented Aug. 26, 1958

2,849,390

WELDED JACKETED URANIUM BODY

David H. Gurinsky, North Plainfield, N. J., assignor to the United States of America as represented by the United States Atomic Energy Commission Application October 11, 1945, Serial No. 621,839

2 Claims. (Cl. 204—193.2)

The present invention relates to a fissionable fuel element having a jacket of light metal, and more particularly relates to fluxes for welding such a jacket.

When uranium metal is employed as the fissionable material in a neutronic reactor of the type described in the Fermi et al. Patent 2,708,656, dated May 17, 1955, it is often desirable to shape the uranium in the form of relatively small cylindrical bodies. When subjected to the action of neutrons, uranium atoms undergo fission with the liberation of a large amount of heat and produce further neutrons that continue the reaction. To prevent overheating, the uranium bodies are cooled by water, and in order to prevent rapid attack of the uranium by the cooling water, the bodies are jacketed with an impervious material such as a light metal that does not greatly affect the free passage of neutrons.

A suitable jacket material for uranium bodies is aluminum. To hermetically seal a preformed aluminum jacket, it is necessary to weld the enclosure at one or more points, and in order to obtain a satisfactory weld, it is necessary to employ a welding flux. While most of the flux applied will remain on the exterior of the metal joint being welded, a certain amount will enter the joint and be sealed in by the weld. Also, some flux will be included in the weld itself.

Since a certain amount of flux will be included in the finished jacketed uranium body, it is essential that the flux be composed of elements having relatively low affinity for neutrons. Many neutronic reactors employing natural uranium as the fissionable material have only a slim margin of neutrons available in excess of those necessary to continue the reaction, and it is desirable, therefore, to reduce to as great an extent as possible the incorporation in the reactor of materials that capture excessive numbers of neutrons and prevent their employment in continuing the neutronic chain reaction.

The "danger coefficient" of an element represents the relative extent to which the element absorbs neutrons. The following table gives presently known values of the "danger coefficient" of the various elements having their natural isotopic content:

| Element | Danger coefficient | Element | Danger coefficient |
|---|---|---|---|
| $H^1$ | 10 | A | ~0.8 |
| $D^2$ | 0.01 | K | 2.1 |
| He | 0 | Ca | 0.37 |
| Li | 310 | Sc | <7 |
| Be | 0.04 | Ti | 3.8 |
| B | 2,150 | V | 4 |
| C | 0.012 | Cr | 2 |
| N | 4.0 | Mn | 7.5 |
| O | 0.002 | Fe | 1.5 |
| F | 0.02 | Co | 17 |
| Ne | <3 | Ni | 3 |
| Na | 0.65 | Cu | 1.8 |
| Mg | 0.48 | Zn | 0.61 |
| Al | 0.30 | Ga | ~1 |
| Si | 0.26 | Ge | (<5) |
| P | 0.3 | As | 2 |
| S | 0.46 | Se | 6.3 |
| Cl | 31 | Br | 2.5 |

| Element | Danger coefficient | Element | Danger coefficient |
|---|---|---|---|
| Kr | <6 | Sm | ~1,430 |
| Rb | ~0.4 | Eu | 435 |
| Sr | 0.57 | Gd | ~6,320 |
| Y | 0.4 | Tb | ~20 |
| Zr | ~0.13 | Dy | ~200 |
| Cb | <0.4 | Ho | ~10 |
| Mo | 1.0 | Er | ~40 |
| Ru | ~2 | Tm | ~20 |
| Rh | 50 | Yb | ~10 |
| Pd | ~2 | Lu | ~30 |
| Ag | 18 | Hf | ~20 |
| Cd | 870 | Ta | 4.6 |
| In | 54.2 | W | 2.7 |
| Sn | 0.18 | Re | ~18 |
| Sb | 1.6 | Os | <1.7 |
| Te | 1 | Ir | ~70 |
| I | 1.6 | Pt | ~2.5 |
| Xe | <6 | Au | 16 |
| Cs | 8.7 | Hg | 82 |
| Ba | 0.30 | Tl | 0.5 |
| La | <2.4 | Pb | 0.03 |
| Ce | <2.4 | Bi | 0.0025 |
| Pr | <2.4 | Th | 1.1 |
| Nd | ~17 | | |

From the above it will be apparent that certain elements should be excluded from a neutronic reactor. Compounds of lithium, boron, cadmium, and certain of the rare earths should be excluded. Employment of a welding flux including such elements would have a tendency to kill the reaction. While only a minute quantity of such elements would be included in each jacketed uranium body, the cumulative effect of such inclusions in approximately 50,000 units would be substantial.

An object of the invention is to provide a novel fuel element comprising a fissionable body and a jacket therefor sealed by welding jackets of fissionable bodies and a welding flux that does not interfere with the use of the fuel element in a reactor where it is to be subjected to the action of neutrons.

Other objects will be evident from the claims and specification read with reference to the drawing, in which:

Figure 1:
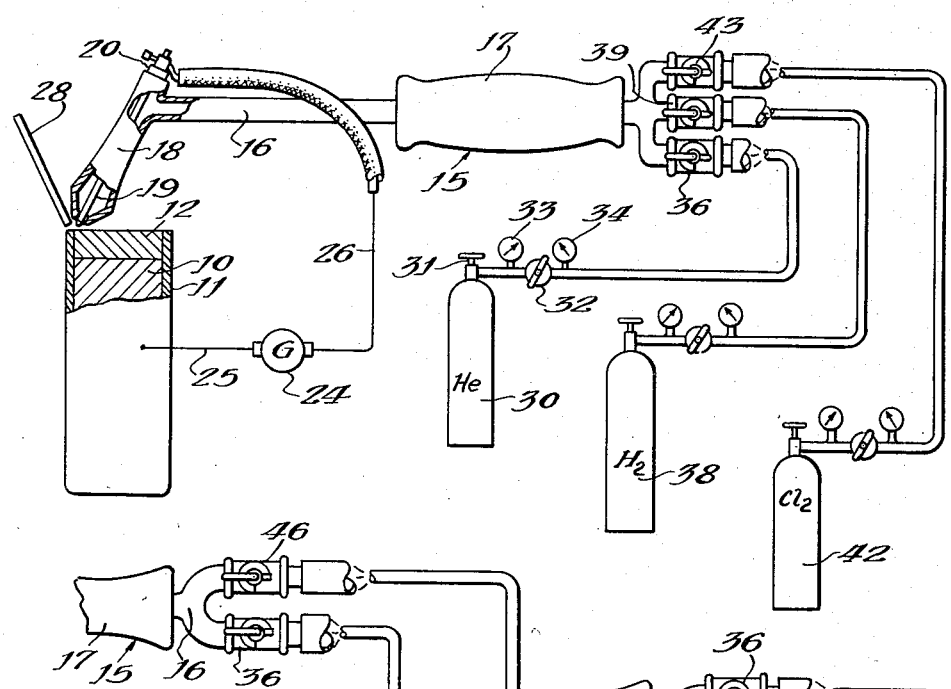
Fig. 1 is a diagrammatic view, partly in section, of one embodiment of apparatus adapted for welding an end cap on an aluminum jacketed uranium body in accordance with the teachings of the present invention.

The several figures of the drawing show variations of the "Heliarc" welding method in which the welding arc is shielded by an atmosphere of inert gas that prevents interaction at the elevated welding temperatures between the metal at the weld and ambient air.

In Fig. 1 a cylindrical uranium body 10 is inclosed in an aluminum cup 11, the open end of which is closed by a closely fitting aluminum cap 12. The joint between the can 11 and cap 12 is sealed by a weld formed by a welding "torch" 15. The torch 15 includes a hollow tube 16 that is provided with a handle 17. The tube 16 leads into a head 18 having a tungsten electrode 19 extending axially therethrough but electrically insulated therefrom by a collar 20. Electric current is provided by a direct or alternating current generator 24, one pole of which is connected to the aluminum cup 11 covering the uranium body by a wire 25, and the opposite pole of which is connected to the tungsten electrode 19 by a wire 26. Metal may be supplied to the weld by an aluminum rod 28.

As in the conventional "Heliarc" welding method, helium is supplied through the tube 16 to the head 18 to surround the arc and prevent corrosion of the weld. A tank 30 provided with the conventional shut off valve 31, regulating valve 32 and pressure indicators 33 and 34 supplies helium at very low pressure to the tube 16 through a hand regulating and shut off valve 36 associated with the torch 15.

The flux necessary to insure a desired weld is provided by combining chlorine gas and hydrogen in the intense heat of the arc to form dry hydrochloric acid gas. The flux so formed has a relatively low neutron capture cross section. As indicated on the table of "danger coefficients" of the elements, supra, it will be seen that hydrogen has a coefficient of 10 and chlorine has a coefficient of 31 which may be regarded as relatively low values. In addition, the flux is in gaseous form and very little will enter the joint between the aluminum cup 11 and the cap 12.

Hydrogen is supplied from a tank 38 through the conventional regulators and valves to a regulating and shut off valve 39 that is in direct communication with the tube 16. Likewise, chlorine is supplied from a tank 42 to a valve 43 in communication with the tube 16. The helium supplied is much greater than the amounts of hydrogen and chlorine and, therefore, the helium acts to prevent action between the hydrogen and the surrounding air in addition to its function of shielding the metal being welded.

Figure 2:
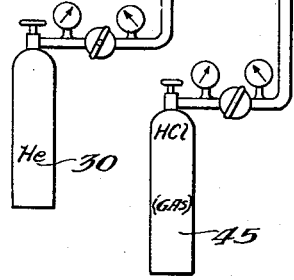
Fig. 2 shows a modification of the apparatus of Fig. 1.

The apparatus of Fig. 2 is similar to that of Fig. 1 with the difference that a tank 45 containing hydrochloric acid gas under pressure is substituted for the hydrogen and chlorine tanks of the first described apparatus. The hydrochloric acid gas is directed into the tube 16 of the torch 15 through a regulating and cut off valve 46. In this case, the action of the hydrochloric acid gas is the same as that described in the above case in which the gas flux is formed in the arc with the exception that the gaseous flux is not localized at the art to the same extent, and that more hydrochloric acid gas is present at the weld.

Figure 3:
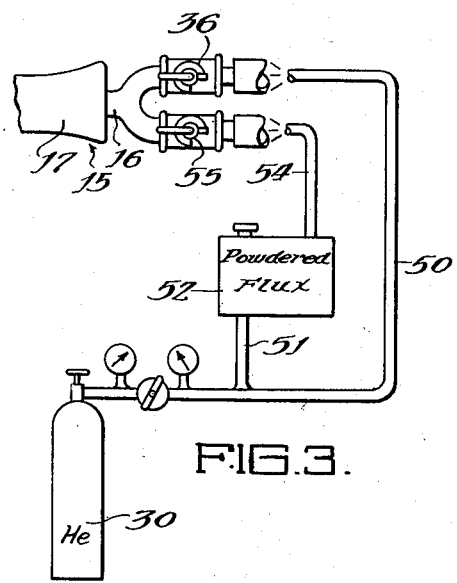
Fig. 3 shows a further modification of the apparatus of Fig. 1.

In the embodiment shown in Fig. 3, helium is employed to shield the arc as in the previous embodiments, but the helium is also employed to convey a finely divided solid flux to the weld. The tank 30 containing helium under pressure is connected to the tube 16 of the torch 15 through a conduit 50 to the regulating and shut off valve 36. A branch conduit 51 is in communication with a reservoir 52 containing a powdered flux. The reservoir 52 is connected to the torch 15 through a conduit 54 and a regulating and shut off valve 55. Helium entering the reservoir 52 is directed through the powdered flux which is divided sufficiently finely to become entrained in the helium and pass through the conduit 54 to enter the torch 15.

A suitable finely divided powdered flux consists of cryolite, potassium chloride and strontium chloride which have been melted together and, subsequent to cooling, ground in a ball mill. The grinding must be continued to a point where the resultant powder is sufficiently fine to permit its transportation by a relatively small flow of helium. The mixture of cryolite, potassium chloride, and strontium chloride may be selected to give a resultant melting point of the mixture between 630° C. and 655° C., only slightly below the melting point of aluminum. This melting range is particularly useful in localizing the flux at the melted portion of the weld. A mixture which gives a melting point of 652° C. comprises cryolite 10 percent, potassium chloride 60 percent, and strontium chloride 30 percent by volume. Each of the elements of this flux has a "danger coefficient" of 31 or less.

The amount of flux transported from the reservoir 52 to the weld may be regulated by relatively adjusting the valves 36 and 55 while preserving the desired flow of helium.

The various features of the invention have been illustrated, and described, for simplicity, in connection with simple manually operated apparatus. It will be understood that various automatic features could be employed. As an example, the torch might be mounted on an adjustable standard and the work rotated with respect to the torch. Likewise, the torch construction might be altered drastically without departing from the scope of the invention.

Various modifications of the invention will be apparent to those skilled in the art and the invention is, therefore, to be limited only by the scope of the appended claims.

What is claimed is:
1. A fuel element to be subjected to the action of neutrons comprising a uranium body, a nonfissionable jacket surrounding said body, said jacket including a portion sealed by a weld, and an inclusion in said sealed jacket at said weld of a flux having a low neutron capture cross-section.
2. A fuel element to be subjected to the action of neutrons comprising a uranium body, a nonfissionable jacket surrounding said body, said jacket including a portion sealed by a weld, and an inclusion in said sealed jacket at said weld of an anhydrous flux, having a low neutron capture cross-section.

References Cited in the file of this patent

UNITED STATES PATENTS

| | | |
|---|---|---|
| 1,196,744 | Chubb | Aug. 29, 1916 |
| 1,963,729 | Alexay | June 19, 1934 |
| 2,238,068 | Miller | Apr. 15, 1941 |
| 2,274,631 | Meredith | Feb. 24, 1942 |
| 2,342,086 | Meredith | Feb. 15, 1944 |

FOREIGN PATENTS

| | | |
|---|---|---|
| 546,961 | Great Britain | Aug. 7, 1942 |

UNITED STATES PATENT OFFICE
CERTIFICATE OF CORRECTION

August 26, 1958

Patent No. 2,849,390

David H. Gurinsky

It is hereby certified that error appears in the printed specification of the above numbered patent requiring correction and that the said Letters Patent should read as corrected below.

Column 2, line 34, strike out "welding jackets of fissionable bodies and".

Signed and sealed this 9th day of June 1959.

(SEAL)
Attest:

KARL H. AXLINE
Attesting Officer

ROBERT C. WATSON
Commissioner of Patents